Nov. 30, 1943.  L. H. LAUGHTON  2,335,775
GAUGE
Filed Jan. 16, 1943
Fig. 1
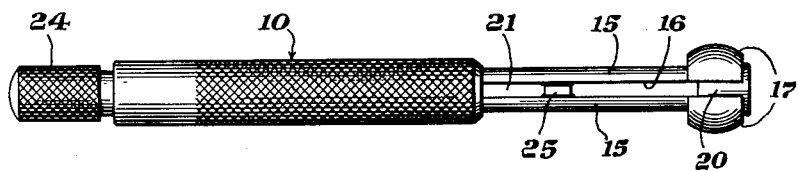
Fig. 2
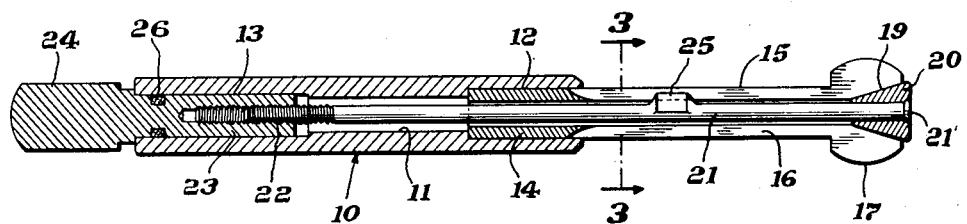
Fig. 3
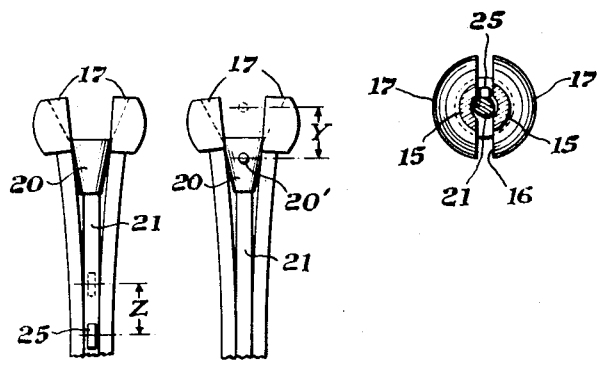
Fig. 4
INVENTOR.
LESLIE H LAUGHTON
BY
Spear, Rawlings & Spear
ATTORNEYS Patented Nov. 30, 1943

2,335,775

UNITED STATES PATENT OFFICE 2,335,775

GAUGE

Leslie H. Laughton, Orange, Mass., assignor to The L. S. Starrett Company, Athol, Mass., a corporation of Massachusetts Application January 16, 1943, Serial No. 472,581

3 Claims. (Cl. 33—178)

In taking off the diameters of small holes for micrometer measurement, the ball point gauge has been found of great efficiency and convenience. Such internal calipering of small interior diameters is critical, but the probing of the hole to get maximum and minimum measurements places the gauge under severe demands that are serious for fine, accurate instrumented results.

Where a control cone is moved axially of a generally spherical head or ball point it has been, in one popular form at least, as in the patent to Eisele No. 1,656,180, controlled by a slender, finely threaded stem engaged by a terminal thumb nut. The contact end of such a gauge is split to permit resilient spread of the hemispherical contact ends by the cone but there was no sustaining area in these gauges apparently available between their ends.

As it is necessary to prevent the threaded stem from rotating with its operating nut in order to get it to move axially of the gauge, the former commercial structure had its tapered or conic wedge pinned to the pull-back rod end with the pin bearing on one side or the other of the kerf in the spherical head for take-off calipering. The kerf of this head was the widest part of its split body so that as the head was expanded in a hole the pin was left more and more adrift in the head slot walls and had to shift to keep its control contact.

My concept of improved structure and functioning is that of radial screw support intermediate the screw ends. It furthermore provides for a more perfect cone and cone action, as well as reducing cost and speeding production of these needed instruments.

In the accompanying drawing I have shown a gauge in accordance with my invention and in the drawing:

Fig. 1 is a view of a typical gauge in accordance with my invention looking at a slotted side of its arms.

Fig. 2 is an enlarged longitudinal section at right angles to the plane of view of Fig. 1.

Fig. 3 is a section on the line 3—3, of Fig. 2 looking toward the ball end of the gauge, and Fig. 4 is an enlarged fragmentary view of the ball end of a gauge in accordance with my invention in extreme phase of expansion with explanatory diagrammatic analysis on its right.

In the gauge illustrated I provide a handle 10 of generally tubular form having its central bore 11 counterbored at opposite ends as at 12, 13.

In the counterbore 12 is held the base or fixed end 14 of a pair of arms 15 formed by a longitudinal slot 16. The arms 15 are formed at their free ends with hemispherical contact heads 17 provided on their inner opposed faces with frustro-conic recesses 19 in which the conic wedge 20 is moved by the threaded adjusting rod 21.

The end of this rod or bolt 21 is slightly upset as at 21' in the conic or tapered wedge 20 which is thus smoothly integrated with the rod end and has a free bearing in the conic recesses 19 in the inner faces of the contact heads 17 so that it can be kept clean and free from any accumulations in the small holes in which it is used to take off an internal diameter.

At its opposite end the rod 21 has an operating thread 22 engaged in a cylindrical nut 23 locked in the counterbore 13 by a ring and groove 26 and rotatable by a milled thumb piece 24. The rod 21 is provided with an integral key 25 which projects radially between the walls of the slot 16 adjacent its base or butt 14 fixed in the counterbore 12 of the handle 10. It is thus guided by the narrowest part of the expansible slot 16 at all times so that it does not have to seek a new contact face to prevent revolution of the stem 21 when the nut 23 is rotated in one or the other direction.

This median position of the integral key 25, according to my invention, affords several advantages as between the ends of the rod 21 it has a maximum vantage point on torque on the stem. The key 25 being adjacent the anchorage base 12 of the arms 15, has a maximum phase of guidance because there is a minimum of distortion at this point as distinguished from greater separation at their outer ends.

In practice, the key 25 is swaged from the cylindrical stock of the rod 21 making for rapidity and volume of production and economy in assembly. The elimination of the old assembly pin which was used on the taper or pull-back section of the adjusting bolt or rod eliminates the difficult and expensive steps involved in the use of such a pin.

The formation of my rotation resisting organization with the thin elongated integral fin or key 25 makes possible the utilization of the butt end part of the slot or split between the resilient arms 15 for contacts for holding the rod against rotation.

Gauges of this type are used in the smaller range of sizes, for example, ⅛″ to $\frac{5}{16}$″, $\frac{5}{16}$″ to $\frac{4}{10}$″ and $\frac{4}{10}$″ to ½″. The larger internal diameters, for example, from ½″ to 6″ are usually taken off by the telescoping type of inside gauge, as for example that shown in the patent to Starrett and Adell No. 905,110, which has long been manufactured by applicant's assignee.

In order to make clear the functioning of these parts, I have shown in Fig. 4 an enlarged fragmentary view with companion basis of comparison on its right. With these as a basis of comparison it will be seen that the key or fin 25 works in a zone Z which is next to the butt 14 of a split arm member 15. This I observed in studying the performance of the told type of this gauge as shown in the aforementioned patent to Eisele, in which the pin 20' or Dutchman as it was called, had a range of bearing in the zone Y. While these former gauges were excellent instruments and established a new technique in toolmaker touch-sensitiveness or feel, now generally accepted as a basis of very fine work, they were relatively clumsy in structure compared with gauges in accordance with my present invention, as will readily be seen by comparison with the structure of the aforementioned Eisele patent, or the comparison basis of Fig. 4.

The use of the pin 20' slowed assembly as is now apparent under the present urged demand for all-out production. The advantage of the thin flat key or fin 25 working in the relatively uniform zone Z is believed apparent from the enlarged view of Fig. 4. These new gauges are in commercial production and use and have demonstrated their advantages over earlier types of like gauges.

My gauges are used in the same manner as those heretofore on the market, except for greater accuracy due to simplicity and freedom from dirt and because of the simplification of the hemi-spherical contacts of ball head of the gauge and the more perfect geometrical basis of its internal wedge action.

What I therefore claim and desire to secure by Letters Patent is:

1. In a gauge of the class described, a handle, a pair of resilient arms, an externally hemi-spherical head on each arm, a conic recess axially of said heads, a conic wedge slidably operable within said recess, a rod fixed in said wedge, means axially effective in said handle and engaging said rod, and a key on said rod adjacent the arm base and guided between said arms.

2. In a gauge of the class described, a handle, a pair of resilient split arms fixed at one end therein, a wedge slidably operable between their free ends, a threaded rod integrated in said wedge, a nut in said handle and engaging the thread of said rod, and an integral key on said threaded rod adjacent the arm base and guided in the split between said arms and thereby held against rotation when the nut is rotated to adjust the ends within a hole to be calipered.

3. The structure of claim 2 in which the key is a thin flat elongated fin.

LESLIE H. LAUGHTON.